March 7, 1939.  M. RIVKIN  2,149,363
ADVERTISING AND EDUCATIONAL DEVICE
Filed Feb. 18, 1936   2 Sheets-Sheet 1
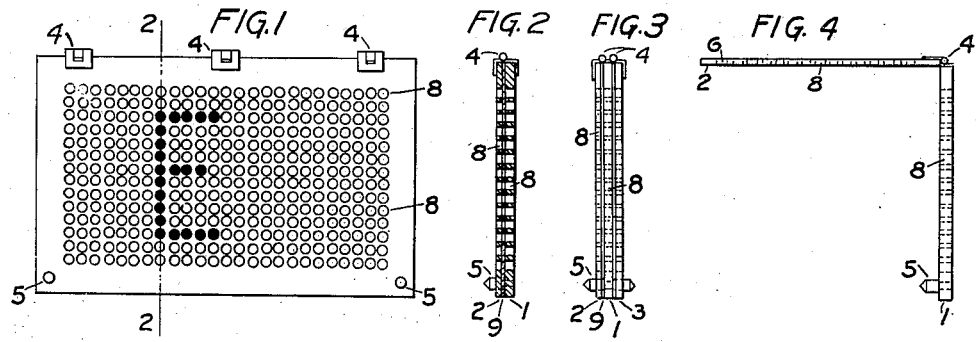
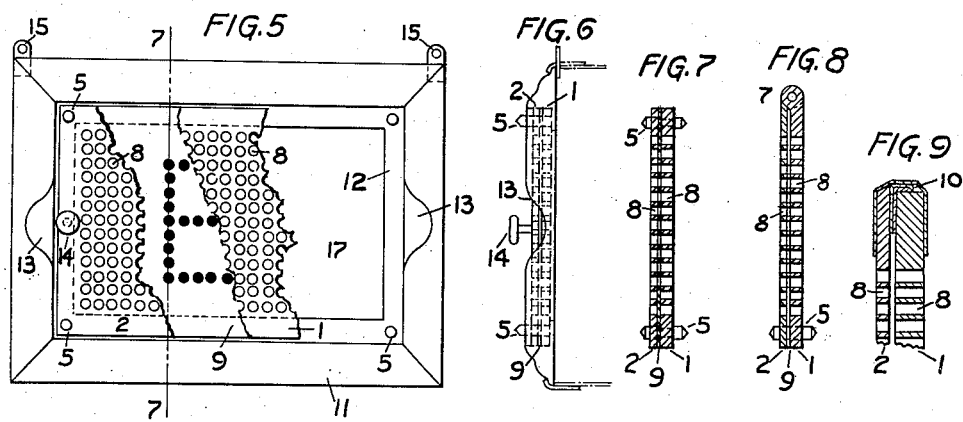
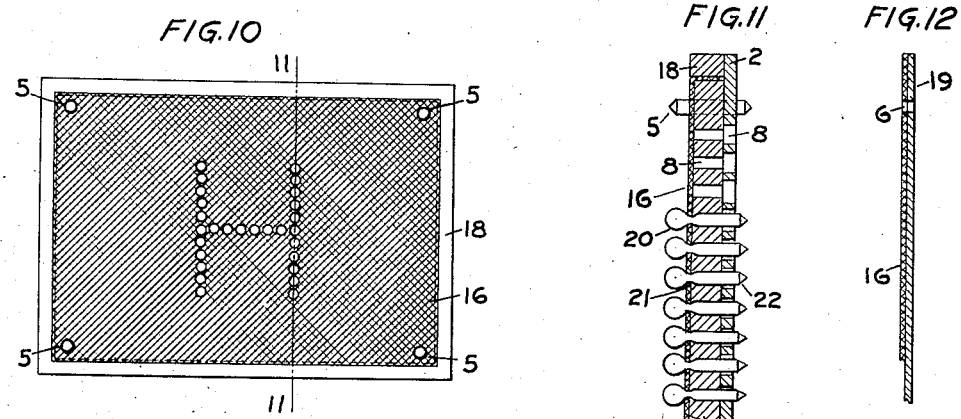
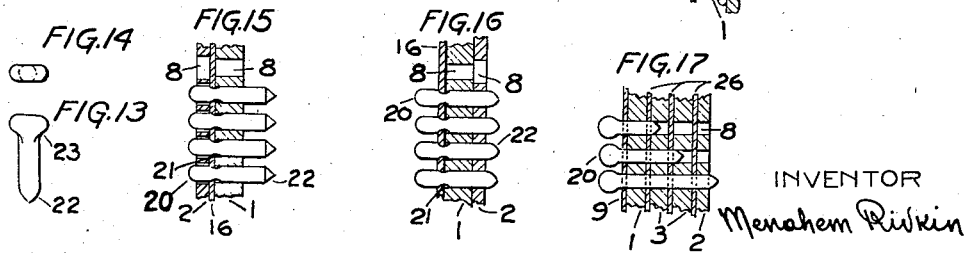
INVENTOR
Menahem Rivkin March 7, 1939. M. RIVKIN 2,149,363
ADVERTISING AND EDUCATIONAL DEVICE
Filed Feb. 18, 1936 2 Sheets-Sheet 2
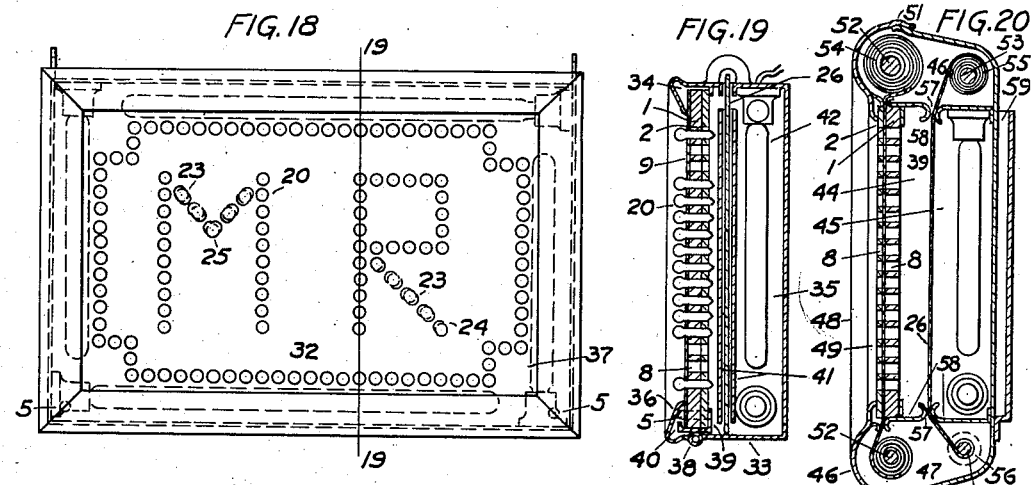
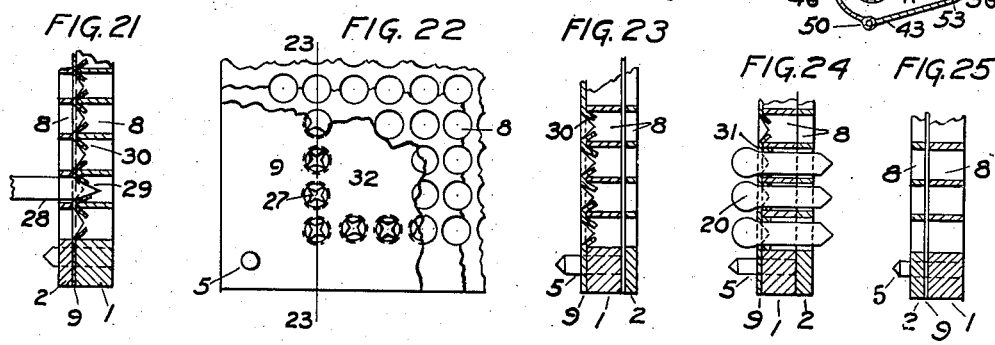
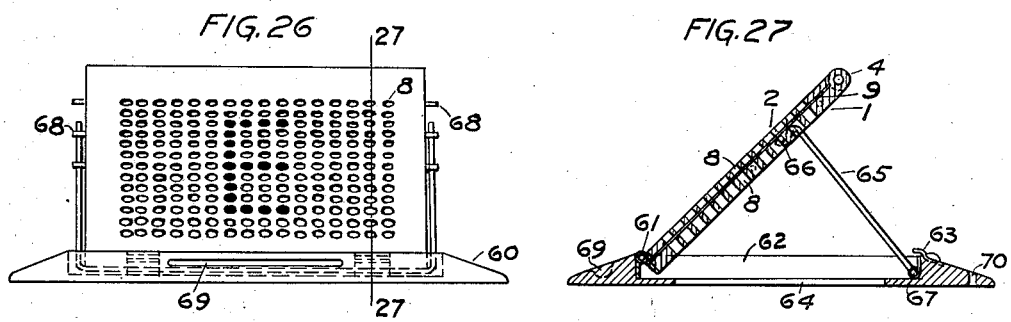
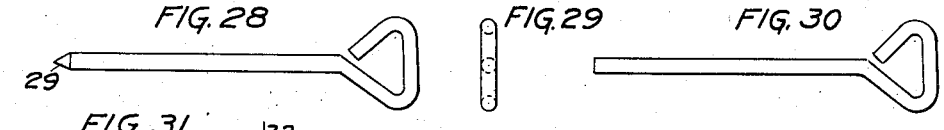
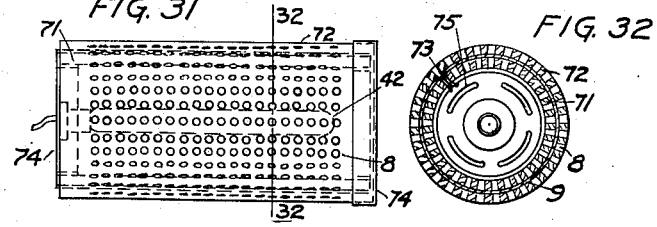
INVENTOR
Menahem Rivkin Patented Mar. 7, 1939

2,149,363

UNITED STATES PATENT OFFICE 2,149,363

ADVERTISING AND EDUCATIONAL DEVICE

Menahem Rivkin, New York, N. Y.

Application February 18, 1936, Serial No. 64,445

8 Claims. (Cl. 40—28)

This invention relates to devices used for advertising purposes and educational play, and more especially to the class of devices wherein characters or configurations can be readily formed on a screen which is covering a structure having a plurality of apertures arranged in rows.

One object of my invention is to provide a simple advertising and educational device having a permanent guiding panel whereby characters or configurations can be readily formed on a screen without injuring said panel or requiring its replacement for each new representation.

Another object of my invention is to provide a simple advertising and educational device having, in combination, means for producing stencils and means for using the produced stencils, to change the visual effect of the device.

Another object of my invention is to provide a simple device of the character described in which stencils produced by means of the device can be easily used and replaced, for producing various visual effects in day light or by illumination.

A still further object of my invention is to provide an illuminated advertising device in which the advertising matter presents a semblance of an electric bulb sign.

A still further object of my invention is to provide a device of the character described by means of which the formation of characters or designs can be readily and variably obtained on a screen having a clean and smooth surface and on which only such perforations may be formed which constitute the characters or design desired, and, therefore, eliminates the necessity of closing up the apertures situated in the space constituting the background.

A still further object of my invention is to provide a device of the character described in which transparent pins, resembling tiny electric bulbs serve a double purpose—of piercing the screen and of transmitting the rays of light from the source of illumination to the visual surface of display.

A still further object of my invention is to provide a device of the character described having simple and secure means for supporting the pins in the perforated body of the device described.

Other objects and applications of my invention as well as details of construction and operation will appear more fully hereinafter when described in connection with the accompanying drawings therein.

Fig. 1 is a front elevation of one form of my invention, illustrating the new device with a produced stencil having the letter "E".

Fig. 2 is a vertical section on the line 2—2 of Fig. 1, showing two perforated members and the stencil between those members.

Fig. 3 is a side elevation illustrating another form of the invention in closed position.

Fig. 4 is a side elevation of the first form of the device, illustrating it in open position.

Fig. 5 is a front elevation of the device set in a frame, showing portions of the apertured members and of the stencil broken away.

Fig. 6 is a side elevation of the device as shown in Fig. 5.

Fig. 7 is a vertical section on line 7—7 of Fig. 5.

Fig. 8 is a vertical sectional view of a modified form of my invention.

Fig. 9 is an enlarged sectional view of a modified form of my invention, showing a portion of the device.

Fig. 10 is a front elevation of another form of the device having a permanent screen.

Fig. 11 is an enlarged section on line 11—11 of the Fig. 10 showing one form of pins used for the formation of characters and the method of supporting same in the screen.

Fig. 12 shows a portion of a sectional view of another form of a permanent screen.

Fig. 13 is an elevation of another style pin.

Fig. 14 is a top view of the pin shown in Fig. 13.

Figs. 15 and 16 illustrate a third style pin, and the method of its use in the formation of characters or designs in connection with my device.

Fig. 17 is a sectional view of a portion of a modified form of my invention, and the method of its use in the formation of characters or designs by the use of pins of various length and screens of various color.

Fig. 18 is a front elevation of an illuminated sign constructed according to my invention.

Fig. 19 is a sectional view on line 19—19 of Fig. 18.

Fig. 20 is a sectional view of another form of an illuminated sign constructed according to my invention.

Fig. 21, which is a sectional view of a portion of the device, illustrates one method of puncturing the screen to form a desired stencil.

Fig. 22 shows a face view of a portion of the device, illustrating the style of perforations formed in the stencil by the method shown in Fig. 21.

Fig. 23 is a sectional view on line 23—23 of Fig. 22.

Fig. 24 is a sectional view of a portion of the device showing another method of supporting the pins in the apertures.

Fig. 25 is a sectional view of a portion of the device showing another style of perforations in the stencil.

Fig. 26 is a front view of another form of the device.

Fig. 27 is a sectional view on line 27—27 of Fig. 26.

Figs. 28 and 30 illustrate two different styles of tools, used in connection with the device, for perforating screens to form stencils.

Fig. 29 is a side view of the tools shown in Fig. 28.

Fig. 31 illustrates a modified form of my device.

Fig. 32 is a sectional view on line 32—32 of Fig. 31.

Referring to the drawings, and particularly to Figs. 1 to 11 inclusive, members 1 and 2 of the device are provided with a plurality of closely and equally spaced apertures 3, of circular or other shape. When the device is in closed position, as shown in Figs. 2, 3 and others, the apertures 3 in member 1 coincide with the apertures 3 in member 2, forming common axes for each and every coinciding pair of apertures.

The members 1 and 2 are preferably connected by one or another form of hinges 4, 7 or 10, at one of their corresponding edges, as shown in Figs. 1, 2, 3, 4, 8, 9 and 27. To facilitate correct closing of the device and to prevent overlapping of apertures, what may be caused by loose hinges, the member 1 is provided with dowel pins 5 snugly fitting into the openings 6 of member 2. The dowel pins 5, beside being a guiding means for the correct closing of the device, also act as a clamping means for keeping members 1 and 2 in closed position. The members 1 and 2 are made of suitable material and of a thickness to suit conditions. One of the factors governing the thickness of member 1 is to provide the proper bearing surface for pins 20, as shown in Figs. 11, 15 to 19 and 24, as it will be explained more fully hereinafter. To facilitate easy stenciling of screen 9, as it will be explained more fully hereinafter, the member 2 is preferably made thinner than member 1. The device must not necessarily be made of square shape and flat surfaces, but may be made of any desired shape and form, provided the apertures 3 in member 1 coincide with the apertures 3 in member 2 and form common axes for each pair of coinciding apertures 3. One such form of my invention, in which the members 1 and 2 are made of cylindrical shape, is shown in Figs. 31 and 32.

The apertures in members 1 and 2 must not necessarily be arranged in horizontal and vertical rows, as illustrated by the drawings, but, when so desired, may be arranged in circular rows, or in any other style; in all cases, however, the coinciding apertures of the members 1 and 2 must have common axes.

A suitable form of hinges for joining members 1 and 2 is illustrated by Figs. 8 and 9. The object of such a construction is to permit member 2 to swing from a position in front of member 1 to a position in the rear of member 1 and to have the apertures in members 1 and 2 coincide when in either position. Fig. 8 illustrates a hinge construction 7 made integral with the members 1 and 2. The same result may be obtained by attaching a similar style hinge, of separate construction, to the members 1 and 2. In Fig. 9, the hinge 10 is made of flexible material, or of a fabric, and fastened in a suitable manner to members 1 and 2.

Figs. 5, 6, 7, 10 and 11 show a modification in the method of clamping the members 1 and 2 together. The members 1 and 2 are joined by means of dowel pins 5 only, thereby eliminating the hinged connection. When so constructed, the member 2 is removable from member 1. In one form of such construction, the dowel pins 5 are made to extend beyond the front and back surfaces of member 1, as shown in Fig. 7, and when so desired, the member 2 may be removed from its position in front of member 1 and placed in the rear of member 1, where it is held in place by the extended dowel pins 5. The number and location of dowel pins 5 depend on the shape and size of the device.

While I illustrated and described different forms of hinge and dowel pin connections which may be used in the construction of this device, I am in no way limiting myself to any particular form of hinge construction or method of clamping, that I may use for joining the members 1 and 2, or for keeping said members in closed position.

In order to produce a stencil with the above described device, a sheet 9 of paper, or of foil, or of any other suitable material, which hereafter will be called screen or stencil—depending on whether it is blank or it is perforated with a design or inscription, is placed between the members 1 and 2. The screen 9 may be made of opaque colored material, or when so desired, it may be made of transparent or translucent material, to produce various visual effects. By closing the device, after placing the screen 9 between its members 1 and 2, the dowel pins 5 force themselves through the screen 9 into the openings 6 of the member 2. The punctured screen is then held in a fixed and firm position between the members 1 and 2, which constitute a common templet and a guide for perforating desired characters or designs on screen 9, to form a stencil.

The screen 9, when placed between members 1 and 2, also serves the purpose of covering all the apertures in the device, for the purpose of either obstructing the rays of light from passing through the apertures, or for obscuring, or coloring the rays of light.

To form desired representations or characters on the screen 9, i. e., to form a stencil, the screen is punctured through a selected group of apertures in member 2 with the help of tools 28 or 30, as illustrated in Fig. 21.

One such character is shown in Fig. 1, the particular representation being the letter "E". The distinguishing feature of my device from other advertising signs of this class is clearly shown in Fig. 5, where portions of members 1 and 2 and of the stencil 9 are broken away to show the relative position of the stencil during the process of formation. As shown in Figs. 1, 5, 10, 18 and 26, the representations appear on smooth panels, having all the apertures, except those forming the characters, covered by unpunctured portions of the stencils, to provide smooth and uniform back grounds.

To facilitate the operation in the formation of the stencil and to make the punctured holes visible for the operator, while he is perforating the screen, the member 1 is preferably made of thin material, but of a substantial thickness to provide necessary strength and firmness.

After the desired representation on the screen is completed and it is ready to be used as a stencil for advertising purposes, or educational purposes, the member 2 is removed to a position in the rear of member 1, leaving the stencil in front view of the device. This is accomplished either by swinging the member 2 to the rear, when same is hinged to member 1, as in forms shown by Figs. 8 and 9, or by removing member 2 from the dowel pins 5 in the front of member 1 and placing it in the rear of it, as described above, and shown in Figs. 11, 16, 17, 19, 23 and 24. Under certain conditions, the stencil 9 may be removed from the position between the members 1 and 2 of the device and placed in front of member 2, being careful to place the stencil with its locating holes 6 over the dowel pins 5 of member 1, what will correctly locate the stencil over the apertures in the device.

When color effects are desired, a color screen of suitable material may be placed between the members 1 and 2, after the stencil is removed to a position in front of the device; the color screen may be clear or translucent. A similar screen of frosted glass, or translucent material, may be placed in front of the stencil when different effects are desired.

In some instances it may be desired to use more than one screen to produce different visual effects, as it will be described hereinafter in connection with the application of pins, or it may be desired to have the stencil located between the members 1 and 2, instead of in the front of the device, and, at the same time, to provide an appropriate place for a color screen. With this in view, the device may be provided with one or more members 3, having apertures arranged in a similar manner as in members 1 and 2. One form of such a modification is shown in Fig. 3. When so constructed, the additional members 3 of the device are being used for other purposes than for preparing the stencil, and therefore, when so desired, the members 3 may be arranged to shift in such a way that their apertures can be placed out of center with the apertures in members 1 and 2 causing thereby an overlapping of apertures. When arranged in this manner, in combination with a source of light located behind the members 3, the overlapping of the apertures 8 in members 2 and 3, or in the members 1 and 3, as the case may be, will cast shadows in the illumined apertures of members 2 or 1, which, when projected through the stencil 9 on a frosted glass, placed immediately in front of the device, will produce a semblance of lighted balls. It may be mentioned here, that a similar effect in projecting characters on a frosted glass may be obtained by locating the source of light at certain angles with the apertures of the device, as it will be described hereinafter in connection with the construction of casings for illuminating my device, when used for advertising purposes.

In the form of the invention shown by Figs. 5 and 6, the device includes a frame 11 having a recess 12, in which are permanently located dowel pins 5 and on which the members 1 and 2 are removably mounted. When so desired, the members 1 and 2 may be suitably hinged to the frame, in a similar manner to the one already described in connection with Fig. 2.

To facilitate the removal of member 2, for the purpose of placing the screen 9 between the members 1 and 2, as hereinbefore described, the frame 11 is provided with recesses 13 for exposing the edges of member 2, or, for the same purpose, the member 2, if so desired, may be provided with one or more knobs 14. The frame 11 may be provided with brackets 15 having openings for hanging the device from a suitable place. The rear of the frame 11 is provided with an opening 17, extending over the full apertured portion of the device, to enable rays of light to pass through the apertures of the stencil. In some instances, it may be desired to attach this form of device to some outside fixture or to a source of light. One form of attaching said device to an outside structure is shown by dot and dash lines in Fig. 6.

A modification of the device is shown by Figs. 10, 11 and 12, in which a screen 16 is made of a suitable resilient fabric and is permanently attached to member 1. One form of attaching the screen 16 permanently to member 1 is illustrated by Fig. 11. The screen 16 is tightly spread over the surface of member 1 covering completely all the apertures and is held in position by a frame 18, tightly fitted over the edges of member 1, or the screen 16 may be fastened to member 1 in any suitable manner. Fig. 12 shows a different form of permanent screen 16 in which the resilient fabric is tightly attached to a frame 19 having openings 6 to fit over the dowel pins 5 of member 1.

A screen of this form provides a permanent panel for the formation of characters and designs by the use of pins 20. The pins may be made of transparent or of opaque material and of different colors, to produce variegated effects. To form characters or designs on the device with the permanent screen, the member 2 is placed over the member 1 having the permanent screen 16, and is held in place by dowel pins 5. The pins 20 are then inserted into the apertures 8 by shoving same through the screen 16. This operation is being illustrated by Fig. 15. In order to enable the pins 20 to enter easily the apertures and to avoid injury to the screen 16, the pins are made with pointed tail ends 22. The heads of the pins 20 may be made to simulate electric bulbs, as shown in Fig. 11. To facilitate the removal of member 2, after the pins are set into the screen, the apertures 8 of member 2 may be made, when so desired, slightly larger to clear the heads of the pins. Fig. 16 shows the member 2 removed from the position in front of member 1 to a position in the rear of member 1. If so desired the pins may be made in their entirety of a slightly smaller diameter than the apertures, as shown in Figs. 15 and 16. The pins may be made with reduced necks 21, as shown in Fig. 11, in which case the resilient screen material, surrounding the neck of the pin, holds the pin securely in place and prevents it from falling out.

Practice and skill may enable the operator to form characters and designs on this device without the use of the guiding member 2. When so used, the member 1 is serving the double purpose—of centering the pins 20 in the apertures 8 and of supporting same after they are inserted. To efface a representation from a permanent screen, in order to prepare the latter for a new representation, it is merely necessary to remove the pins 20 and allow the openings in the screen to close up under the resilience of the texture of the tightly stretched fabric. Brushing the surface of the screen 16 with an ordinary clothes brush will help to bring the texture of the screen to its original smoothness.

The pins 20 may have heads of a larger diameter than their bodies, as shown in Fig. 11, or the heads may be of the same thickness as their bodies, as shown in Figs. 15 and 16. When the pins are used in connection with changeable stencils, they may be made without the reduced necks 21, as shown in Figs. 17, 19 and 24. The enlarged heads of the pins, beside their attractive appearance when illuminated, also serve the purpose of a stop, for guiding the insertion of the pins into the apertures of the device, giving the characters or designs a uniform height and appearance.

The heads of the pins may be of different shape and form. In Figs. 13 and 14 is illustrated a pin having an oblong head 23. In the letters "M—R" of Fig. 18, beside the pins 20 and 23, are shown pins having heads 24, which are elongated on one side of the center, and a pin having a triangular shape head 25. Pins of such shape, in the instance illustrated by the letters "M—R," in Fig. 18, were used for the sole purpose of filling out the larger diagonal spaces between centers of apertures. Pins having heads of the shapes shown, or pins with heads of various other shapes or form, which are not being illustrated, may be also used for the purpose of producing various visual effects.

As hereinbefore described, the device may contain more than two apertured members. Fig. 17 illustrates a modified form of my device having four apertured members, a stenciled screen in front of those members and screens 26 of various colors placed between those members. The pins 20 for this form of my device are made of colorless transparent material and of lengths suitable for piercing one or more screens. When rays of light are projected on the pins from behind the apertured members, variegated effects are being produced by the pins, which is caused by the combined colors of the unpunctured screens through which the rays of light are being transmitted to the pins. To illustrate this method of producing color effects we may use a blue color for the rear screen in Fig. 17 and a yellow color for the second screen from the rear. Such a combination will produce blue pins in the second row and green pins in the top row.

Figs. 21 to 24 inclusive illustrate one method of perforating the screen 9 by the use of tool 28, as shown in Fig. 21. The tool, which is separately illustrated by Fig. 28, has one end pointed to a pyramidal form 29, which, when piercing the screen, as shown in Fig. 21, forms openings of the shape shown in Figs. 21 and 22, in which the screen material, covering each aperture, is cut into four triangular shaped tongues 30 protruded into the apertures 8 of member 1. With the member 2 removed to a rear position, as shown in Fig. 23, the surface of the stencil appears, as shown in Fig. 22, perforated with crystaline shaped openings 27. Perforations of this shape, when made on a screen of colored foil, with rays of light thrown upon same from the outside, produce beautiful visual effects which are caused by the reflection of light from said perforations.

Fig. 25 shows perforations produced with a straight shaped tool shown in Fig. 30. The tool is of same size and shape as the apertures 8 in the device, and, therefore, perforates the screen with openings of same shape and size as the apertures 8 in the member 1. Fig. 25 shows a cross section through the device having the screen perforated with the straight tool and in which the punctured screen material was cut out. Stencils having perforations of this form are preferable, when used without pins and when a source of light is applied from the rear of the device. Such perforations provide a full opening in the stencil and therefor give fully illuminated characters or designs.

Fig. 24 illustrates the method used for supporting the inserted pins 20 in the apertures of the device. The empty aperture 8 in Fig. 24 shows the protruded tongue-shaped screen material 30 which is formed before the pins are completely inserted into the apertures 8. The same figure 24 illustrates the protruded material 30 shoved to a position 31 by the inserted pins 20. It is self evident from the illustration, that the inserted pins 20, by forcing the protruded material 30 against the walls of the apertures to the position 31, effect thereby a tight fit and are being kept in place under friction.

In practice various uses of the device will be found. It is essentially useful as an illuminated sign for advertising restaurant menus, theater programs or the like, and adopted to be used for inside or outside displays. The device may be constructed in various lengths and forms to suit conditions and requirements, or several small units may be arranged so, as to produce the desired effect.

One arrangement, in which the device is used as an illuminated sign, is illustrated by Figs. 18 and 19, wherein a panel, consisting of the joined members 1 and 2 with a screen 9, is mounted in the front compartment 34 of a housing 33. The stencil 9 is produced as hereinbefore described. Pins 20 inserted in the perforations, and supported in the apertures of members 1 and 2, form the letters "M—R" surrounded by a border on a smooth background 32. A frame 36 having an opening 37, co-extensive with the aperture covered space of the panel, is hinged to the front part of the housing 33, at a point 38. The hinged frame 36 permits the placing of members 1 and 2 and screen 9 in the housing and their removal from same, when so desired. The partition 39, of the housing 33, has an opening equal in size and shape to the opening in the hinged frame 36, to permit rays of light to pass through the apertures of the panel members 1 and 2, and illuminate the pins. This partition 39 also serves as an abutment for the panel members 1 and 2. As shown in Fig. 19, the bottom member of the front compartment 34 has a flanged edge portion 40 whereby the apertured panel members 1 and 2 are retained in place till the closing of the front frame 36, which, when closed, holds the panel members 1 and 2 and stencil 9 tightly in position against the partition 39. The front compartment 34 of the housing 33 may be separated from the rear compartment 35 by a transparent colored screen 26 which slides between members 41. The object of the colored screen 26 is to produce variegated effects by coloring the rays of light when such are projected by a source of light positioned behind the screen.

Electric lamps 42 may be utilized as a source of illumination. These lamps are preferably mounted in such a position as to prevent direct rays of light to project through the openings in the panel.

As already mentioned hereinbefore, the source of light may be arranged so as to project the rays of light at desired angles to the surface of the panel, in order to cast shadows in the openings of the panel. The rays of light with the cast shadows may be projected on a frosted glass placed immediately in front of the stencil 9, which will produce a semblance of lighted balls, when so used, the pins 20 are eliminated. By having the lamps 42 placed all around the panel and arranged to flash alternately, it will produce on the frosted glass a semblance of revolving balls, which is caused by the changing positions of the shadows in the openings 8.

When so desired, the stencil may be illumined by means of neon tubes or the like, or by any other means and form of illumination.

Fig. 20 illustrates another housing to be used in combination with the described device. The housing 43 consists of four compartments 44, 45, 46 and 47. The apertured members 1 and 2 of the device are located in the front compartment 44. A front wall 48 having an opening 49, co-extensive with the aperture covered space in members 1 and 2, is hinged at point 50 and is arranged with a clamping device 51 for keeping it shut after the members 1 and 2 are mounted in the housing. Two pair of rollers 52 and 53 are arranged to operate in the upper and lower compartments 46 and 47. The front pair of rollers 52 contain a stock of screen material 54, to be used for preparing stencils. The back pair of rollers 53 contain a roll of colored screen material 55, to be used for producing variegated effects. The rollers are actuated by knobs 56 attached to the rollers on the outside of the housing. In order to keep the rolling materials in proper position they are being guided through openings 57 located in the upper and lower partitions 58. It is evident from Fig. 20, that, in order to replace a stencil, it is necessary to open the front wall 48. The member 2 must not necessarily be removed, it may be sufficient to lift the apertured member 2 slightly above the surface of the stencil in order to permit the screen material 54 to roll freely. For this purpose, the dowel pins 5, used for joining the members 1 and 2, shown in Fig. 18, are arranged in such a manner as not to interfere with the screen material, and to permit a free passage of the material between the dowel pins 5. New screen material is then rolled in proper position to cover the apertures of members 1 and 2. After member 2 is placed back in position, the front wall 48 is closed and the device is ready for the formation of the new stencil, in the manner hereinbefore described. After the stencil is prepared, the member 2 may be removed and stored in the pocket 59 for future use. The roller arrangement described permits the storing of produced stencils on one of the rollers and, therefore, any of the old prepared stencils can be easily rolled in place, in case it is desired to use such over again.

The color screen material 55, contained on the rear pair of rollers 53, which are located between the source of light and the stencil, may be made up of various colors. The operation of the color screen rollers is self evident from Fig. 20.

My invention also contemplates modified forms of the device described which may be used for educational purposes or pastime. One form of such device is shown by Figs. 26 and 27. The structure consists of apertured members 1 and 2, as hereinbefore described, hinged to a base 60 at point 61. The base is provided with a recess 62 for enclosing the members 1 and 2, when the device is in closed position, and is retained in such position by a clamp 63. An opening 64 in the base 60, co-extensive with the aperture covered area of members 1 and 2, permits rays of light to pass through the stencil when the device is placed opposite a source of light. As previously described in combination with Figs. 1 to 9, the member 1 engages member 2 either by dowel pins 5, or by the combination of a hinge 4 and dowel pins 5. A supporting member, having two end pieces 65 arranged with hooks 66, is hinged to the base 60, at a point 67. The members 1 and 2, when in open position, as shown by Figs. 26 and 27, may be retained at various desired angles in relation to the base. For this purpose the member 1 is arranged at both sides with a number of pins 68, to be engaged by the hooks 66 of the supporting members 65. The base 60 is provided with a groove 69 for holding a suitable punching tool. A hole 70 is provided in the base 60 for hanging the apparatus on a wall or window.

Figs. 31 and 32 illustrate another form of the same device in which members 71 and 72 of a cylindrical form, are provided with a plurality of apertures 8, of circular or other form, similar to members 1 and 2 above described. Said apertures in member 71, are arranged to coincide with the apertures in member 72, forming common axes for each and every coinciding pair of apertures. Member 71 is provided with a slot 73, for engaging the ends of screen 9, which is placed between members 71 and 72 for producing a stencil. The stencil is being produced in a similar manner to the flat stencil 9, above described, or the screen may be of the permanent type made of a resilient texture. The outside ends of the inside and outside apertured cylindrical members 71 and 72 are closed up by circular walls 74. An electric lamp 42 is located in the inside cylindrical member 71. The outside cylindrical member 72 is made to slip over the inside cylindrical member 71, after the latter is covered with a screen 9 for producing a stencil. The end walls 74 are provided with openings 75 for ventilating the device. This device, in its cylindrical form, may be arranged to be supported in either vertical or horizontal positions.

While I have shown several embodiments of my invention, for the purpose of describing the same and illustrating its principles of construction and operation, it is apparent that various changes and modifications may be made therein without departing from the spirit of my invention.

I claim:

1. A device of the class described comprising two honeycombed members removably positioned in a frame in face to face position, whereby the apertures of one member coincide with the apertures of the second member, a solid screen removably positioned between said honeycombed members, the apertures of said members serving as guides for perforating said screen to produce a stencil having desired configurations on a solid background and means for exposing said stencil by removing the front honeycombed member.

2. A device of the character described, including a plurality of apertured members mounted for positioning in face to face relation with their apertures respectively registering and for movement relative to one another, an imperforate pierceable member disposed between adjacent faces of said apertured members for the purpose of forming a perforate design therein by piercing said imperforate member through a selected group of apertures in the apertured members when in said face to face position, and means carried by one of said apertured members arranged to engage recesses in the adjacent apertured member when said apertured members are in face to face relation, said means tending to hold said apertured members in such face to face relation and insure registration of the respective apertures therein.

3. A device of the character described, including a plurality of apertured members mounted for positioning in face to face relation with their apertures respectively registering and for movement relative to one another at will, an imperforate pierceable member disposed between adjacent faces of said apertured members for the purpose of forming a perforate design therein by piercing said imperforate member through a selected group of apertures in the apertured members when in said face to face position, and pins engaging predetermined apertures in the apertured members and piercing the imperforate member to visibly portray the perforate design produced in said imperforate member.

4. In a device of the character described, a plurality of apertured members hingedly connected together for relative movement to and from face to face position in which the apertures in one member respectively register with the apertures in the adjacent member, and means carried by one of said apertured members arranged to engage recesses in the adjacent apertured member when said apertured members are in face to face relation, said means tending to hold said apertured members in such face to face relation and insure registration of the respective apertures therein.

5. In a device of the character described, a plurality of apertured members means connecting said apertured members together for relative pivotal movement to and from face to face position in which the apertures in one member respectively register with the apertures in the adjacent member, and an imperforate member disposed between adjacent faces of said apertured members so that a perforate design may be formed in said imperforate member by piercing the same through selected apertures in the apertured members when in said face to face position.

6. A device of the character described including a plurality of apertured members hingedly connected together for relative movement to and from face to face position in which the apertures in one member respectively register with the apertures in the adjacent member, an imperforate member disposed between adjacent faces of said apertured members so that a perforate design may be formed in said imperforate member by piercing the same through selected apertures in the apertured members when in said face to face position, and pins engaging predetermined apertures in said apertures and piercing the imperforate members to visibly portray the perforate design produced in said imperforate member.

7. A device of the character described including a plurality of apertured members, a supporting structure for said apertured members, means connecting the apertured members and said supporting structure together constructed and arranged to permit relative pivotal movement of the former to and from face to face position with their apertures respectively registering, and an imperforate pierceable member disposed between adjacent faces of said apertured members so that a perforate design may be formed in said imperforate member by piercing the same through selected apertures in the apertured members when in said face to face position.

8. A device of the character described comprising a frame structure, a plurality of apertured members mounted upon said frame structure for relative movement to and from face to face position with their apertures respectively registering, an imperforate member removably positioned between adjacent faces of said apertured members so that a perforate design may be formed in said imperforate member by piercing the same through selected apertures in the apertured members, said perforate design being produced upon a solid background which may be exposed together with the design by movement of said apertured members relative to one another, and means carried by one of said apertured members arranged to engage recesses in the adjacent apertured member when said apertured members are in face to face relation, said means tending to hold said apertured members in such face to face relation and insure registration of the respective apertures therein.

MENAHEM RIVKIN.